United States Patent
Nasserrafi et al.

(10) Patent No.: US 12,502,825 B2
(45) Date of Patent: Dec. 23, 2025

(54) METHOD AND APPARATUS FOR IN-SITU THERMAL MANAGEMENT AND HEAT TREATMENT OF ADDITIVELY MANUFACTURING COMPONENTS

(71) Applicant: Sprit AeroSystems, Inc., Wichita, KS (US)

(72) Inventors: Rahbar Nasserrafi, Andover, KS (US); Paul R. Toivonen, Derby, KS (US); Gerald E. Hicks, Jr., Wichita, KS (US); Daniel R. Klenosky, Wichita, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 1211 days.

(21) Appl. No.: 17/092,824

(22) Filed: Nov. 9, 2020

(65) Prior Publication Data
US 2022/0143900 A1     May 12, 2022

(51) Int. Cl.
*B33Y 40/20*     (2020.01)
*B22F 10/30*     (2021.01)
(Continued)

(52) U.S. Cl.
CPC ............ *B29C 64/118* (2017.08); *B22F 10/30* (2021.01); *B22F 10/50* (2021.01); *B29C 64/209* (2017.08);
(Continued)

(58) Field of Classification Search
CPC ........... B22F 10/25; B22F 10/50; C22F 1/002
See application file for complete search history.

(56) References Cited

U.S. PATENT DOCUMENTS

| 10,201,875 B2 | 2/2019 | Liebl et al. |
| 10,639,714 B2 | 5/2020 | Dariavach et al. |
| (Continued) | | |

FOREIGN PATENT DOCUMENTS

| CN | 102240860 A | 11/2011 | |
| CN | 108380881 A * | 8/2018 | ............. B22F 10/00 |
| (Continued) | | | |

OTHER PUBLICATIONS

CN 102240860 A English language translation (Year: 2011).*
(Continued)

*Primary Examiner* — Sally A Merkling
*Assistant Examiner* — Sean P. O'Keefe
(74) *Attorney, Agent, or Firm* — Stinson LLP (57) ABSTRACT

Methods for in-situ solution heat treating an additively manufactured metallic component in order to increase the mechanical properties thereof and systems to perform the same. The method can include depositing filler material on a substrate forming a deposition layer, measuring the temperature of a heat affected zone corresponding to the deposition layer, and solution heat treating the deposition layer subsequent to the depositing and proximate to the deposition head. The solution heat treating can include heating the deposition layer to a solution temperature so as to achieve solution heat treatment and controlling the cooling rate of the deposition layer to at or above the critical cooling rate of the filler material until a target temperature is reached. Optionally, the method can include inducing an electron flow in the deposition layer to electromagnetically stir molten filler material in the heat affected zone.

14 Claims, 7 Drawing Sheets

(51) Int. Cl.

| | | |
|---|---|---|
| *B22F 10/50* | (2021.01) | |
| *B29C 64/118* | (2017.01) | |
| *B29C 64/209* | (2017.01) | |
| *B29C 64/245* | (2017.01) | |
| *B29C 64/314* | (2017.01) | |
| *B29C 64/393* | (2017.01) | |
| *B29C 71/02* | (2006.01) | |
| *B29K 505/02* | (2006.01) | |
| *B33Y 10/00* | (2015.01) | |
| *B33Y 30/00* | (2015.01) | |
| *B33Y 40/00* | (2020.01) | |
| *B33Y 50/02* | (2015.01) | |
| *B33Y 70/00* | (2020.01) | |
| *C22F 1/00* | (2006.01) | |

(52) U.S. Cl.
CPC .......... *B29C 64/245* (2017.08); *B29C 64/314* (2017.08); *B29C 64/393* (2017.08); *B29C 71/02* (2013.01); *B33Y 40/00* (2014.12); *B33Y 40/20* (2020.01); *B29C 2071/025* (2013.01); *B29K 2505/02* (2013.01); *B33Y 10/00* (2014.12); *B33Y 30/00* (2014.12); *B33Y 50/02* (2014.12); *B33Y 70/00* (2014.12); *C22F 1/002* (2013.01)

(56) References Cited

U.S. PATENT DOCUMENTS

| | | |
|---|---|---|
| 2013/0015609 A1 | 1/2013 | Landau |
| 2015/0064047 A1 | 3/2015 | Roderick et al. |
| 2015/0184494 A1 | 7/2015 | Vestavik et al. |
| 2016/0052079 A1 | 2/2016 | Ackelid |
| 2016/0074965 A1 | 3/2016 | Jakimov et al. |
| 2019/0184494 A1 | 6/2019 | Bennett et al. |
| 2019/0270164 A1 | 9/2019 | Price |
| 2021/0308805 A1* | 10/2021 | Ma .................. B22F 12/224 |

FOREIGN PATENT DOCUMENTS

| | | | |
|---|---|---|---|
| CN | 108436083 A | | 8/2018 |
| CN | 109623100 A | * | 4/2019 |
| CN | 111299578 A | | 6/2020 |
| DE | 102018203877 A1 | | 9/2019 |
| WO | 2016145397 A1 | | 9/2016 |
| WO | 2019002563 A2 | | 1/2019 |
| WO | 2023002468 A1 | | 1/2023 |

OTHER PUBLICATIONS

International Search Report and Written Opinion dated Feb. 14, 2022 for related PCT Patent Application No. PCT/US2021/057730 which was filed on Nov. 2, 2021; 13 pages.

Bai, X.W. et al., "Modeling of the Moving Induction Heating Used in Weld-based Additive Manufacturing."; State Key Laboratory of Digital Manufacturing Equipment and Technology, Huazhong University of Science and Technology.; pp. 1088-1098.

Bruckner, F. et al., "Hybrid Laser Manufacturing." Fraunhofer IWS, Dresden Germany; pp. 6.

European Search Report, Europe Patent Application No. 21889915. 1, dated Sep. 16, 2024, 22 pages, European Patent Office, Munich, Germany.

* cited by examiner

METHOD AND APPARATUS FOR IN-SITU THERMAL MANAGEMENT AND HEAT TREATMENT OF ADDITIVELY MANUFACTURING COMPONENTS

BACKGROUND

Metal based additive processes are being used to create components having complex geometries and internal structures that could not otherwise be created using traditional manufacturing processes such as forging, casting, machining, or the like. At a high level, metal based additive manufacturing joins successive layers of metallic material following a three-dimensional model, building up a representative three-dimensional component layer by layer. Many different additive manufacturing processes exist including, at a high level, electrochemical deposition, material and binder jetting with furnace infusion, kinetic fusion, material extrusion (such as with friction stirring or Joule heating), liquid metal jetting, powder bed fusion, solid state sheet lamination, and a number of direct energy deposition (DED) processes.

By way of example, DED processes place a feedstock (such as a fed wire or blown powder) following the contours of a two-dimensional "layer" of the three-dimensional model, and then progressively melts the feedstock using a laser or other energy source. The melted feedstock fuses, melds, welds, or otherwise joins to the surrounding material, progressively forming a portion of the three-dimensional component. The process is repeated for each successive layer of deposited material until the representative component is fully formed.

Although additive manufacturing beneficially allows for the creation of complex geometries otherwise unattainable by traditional manufacturing processes, the resulting three-dimensional components may exhibit reduced mechanical properties as compared to traditional processes. For example, for aluminum components, the cooling rates from deposition are too slow to achieve a super saturated solid solution (SSSS) microstructure, resulting in inferior corrosion resistance and lower mechanical properties due to formation of coarse precipitates. Indeed, most heat solution treatment recipes for precipitation hardening aluminum alloys limit the maximum time from solution treatment temperature to full immersion in the quench media to within 15 seconds, in order to achieve the SSSS condition, which is an essential precursor condition for effective natural or artificial aging response to the desired temper. For that reason, once the aluminum alloy part has been fully deposited, in order to reverse the damage done by slow post-deposition cooling rates, precipitation hardened aluminum alloys are often re-solution heat treated and rapidly quenched. However, re-solution treatment of fully deposited aluminum parts could result in abnormal grain growth, due to the severe stored strain energy from the solid-state deposition process. Moreover, thermal stresses can lead to severe distortion especially for one-sided deposits and other unsymmetrical deposits.

Components formed from other types of metals similarly exhibit inferior mechanical properties as compared to those formed from more traditional processes. For example, metal based additive manufacturing processes are ineffective for achieving a solution treated condition for precipitation hardening alloys, martensite transformation for alpha-beta titanium alloys, retained beta for metastable beta titanium alloys, and solution annealed condition for 300 series stainless steels. Still more, for certain alloys, metal based additive manufacturing process can result in precipitation of chromium carbide, which can adversely impact corrosion resistance. More particularly, random and often slow cooling from deposition often is inadequate to allow proper solution heat treatment for precipitation hardening alloys such as certain titanium alloys, nickel base alloys, and precipitation hardened stainless steel alloys, solution annealed austenitic stainless steels for which rapid cooling is needed to avoid the precipitation of coarse chromium carbide precipitates that reduce corrosion resistance, and hardenable martensitic steels, which require rapid cooling/quenching from specific temperature range in order to achieve Martensite phase that is necessary for achieving desired mechanical properties through subsequent tempering operation. Martensitic precipitation hardened steels also need to be cooled fast enough from the austenite phase in order to achieve Martensite phase that is required for proper response to subsequent precipitation hardening (aging) cycle.

Accordingly, currently additive manufacturing cannot be used for components that require high mechanical strength or those that require tight dimensional tolerances without undergoing time consuming and expensive post-formation processing. There thus remains a need for an additive manufacturing process that results in components having mechanical properties and dimensional tolerances approaching or even exceeding those of components formed by more traditional manufacturing processes such as forging, casting, machining, or similar processes, particularly without time-consuming, post-formation processing.

BRIEF SUMMARY OF THE INVENTION

At a high level, the present invention is directed to actively managing heat flux in process during and after deposition via external heating, for example via induction heating, to provide in-situ heat treatment (incremental heating of the deposited layer during/shortly after the deposition), particularly a solution heat treatment step, and in some cases, followed by rapid cryogenic quenching or rapid cooling. These steps would prevent coarsening of macrostructure and microstructure of the component being formed, while also limiting the length/area in which the part is heated at any given time. Optionally, an electro-plasticity process can be employed to induce an electron flow in the heat affected zone of the deposition layer to further control microstructure or macrostructure. The resulting additively manufactured component would exhibit improved mechanical properties as compared to known additively manufactured components. In some instances, the mechanical properties could approach or even exceed the mechanical properties of components formed by more traditional manufacturing processes such as forging, casting, machining, or the like.

More particularly, some aspects of the invention are directed to a method of additively manufacturing a metallic component. The method can include depositing, using a deposition head operatively controlled by a central processing unit, filler material on a substrate forming a deposition layer, measuring, via a temperature sensor controlled by the central processing unit, the temperature of a heat affected zone corresponding to the deposition layer, and solution heat treating the deposition layer subsequent to the depositing and proximate to the deposition head. The solution heat treating can include heating the deposition layer to a solution temperature so as to achieve solution heat treatment and controlling the cooling rate of the deposition layer to at or above the critical cooling rate of the filler material until a target temperature is reached. These steps can be repeated for multiple deposition layers as the additively manufactured part is being formed.

Other aspects of the invention are directed to a method of additively manufacturing a metallic component. The method can include depositing, using a deposition head operatively controlled by a central processing unit, filler material on a substrate forming a deposition layer, and inducing, via a voltage source controlled by the central processing unit, an electron flow in the deposition layer. The depositing can include forming a heat affected zone in the deposition layer and the substrate including molten filler material, and the inducing can include electromagnetically stirring the molten filler material in the heat affected zone. These steps can be repeated for multiple deposition layers as the additively manufactured part is being formed.

Still other aspects of the invention are directed to a system for in-situ solution heat treating an additively manufactured component. The system can include a deposition head, a temperature sensor, a heat source, a cooling source, and a central processing unit configured to control the operation of the deposition head, the temperature sensor, the heat source, and the cooling source. For example, the central processing unit may form, via the deposition head, a deposition layer on the substrate, measure, via the temperature sensor, a temperature of at least a portion of the deposition layer, solution heat treat, via the heat source, the deposition layer subsequent to the deposition layer being formed on the substrate by heating the deposition layer to a solution temperature so as to achieve solution heat treatment, and cool, via the cooling source, the deposition layer at or above a critical cooling rate of the filler material until a target temperature is reached. The central processing unit can repeat these steps for multiple deposition layers as the additively manufactured part is being formed.

These and other features will be discussed in more detail below in connection with the accompanying drawings.

BRIEF DESCRIPTION OF THE DRAWINGS

The present invention is described in detail below with reference to the attached drawing figures, wherein.

DETAILED DESCRIPTION OF THE INVENTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made, without departing from the scope of the current invention. The following detailed description is, therefore, not to be taken in a limiting sense. The scope of the current invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc., described in one embodiment may also be included in other embodiments, but is not necessarily included. Thus, the current technology can include a variety of combinations and/or integrations of the embodiments described herein.

Generally, aspects of the invention are directed to in-situ solution heat treatment of the heat affected zone during additive manufacturing to increase component strength and other mechanical properties which can be further enhanced by, for example, grain refinement, dendritic fragmentation, and generation of new nuclei in order to achieve copious heterogeneous nucleation via magnetic stirring during deposition. By combining electromagnetic or even mechanical agitation with in-situ solution heat treatment and rapid cooling, macrostructure and microstructure can be simultaneously optimized to achieve the best combinations of mechanical properties and corrosion resistance. In some embodiments, the minimum temperature of the substrate proximate the heat affected zone is controlled via resistance or radiation heat transfer in order to minimize residual stresses and also to allow metal additive manufacturing for quench cracking sensitive alloys.

More particularly, aspects of the invention are directed to in-situ solution heat treatment during deposition or welding to optimize the microstructure of the component being manufactured. By incrementally/progressively solution treating and quenching the material deposited and in its vicinity (i.e., the heat affected zone) layer by layer or every few layers, the necessary pre-cursor conditions are developed to achieve the best combination of mechanical properties and corrosion resistance. Again, current additive manufacturing technologies result in microstructures and mechanical properties that are inferior to those of wrought components and in addition result in excessive distortion in the resulting part during or after deposition after the final heat treatment. Embodiments of the invention control the heating and cooling of the additive manufacturing part one increment at a time to ensure good adhesion between the deposited layers, and effectively solution heat treat these zones one increment at a time resulting in an additively manufactured metal part that can be made faster, and with much less distortion as that which is achievable with the known processes.

Figure 1:
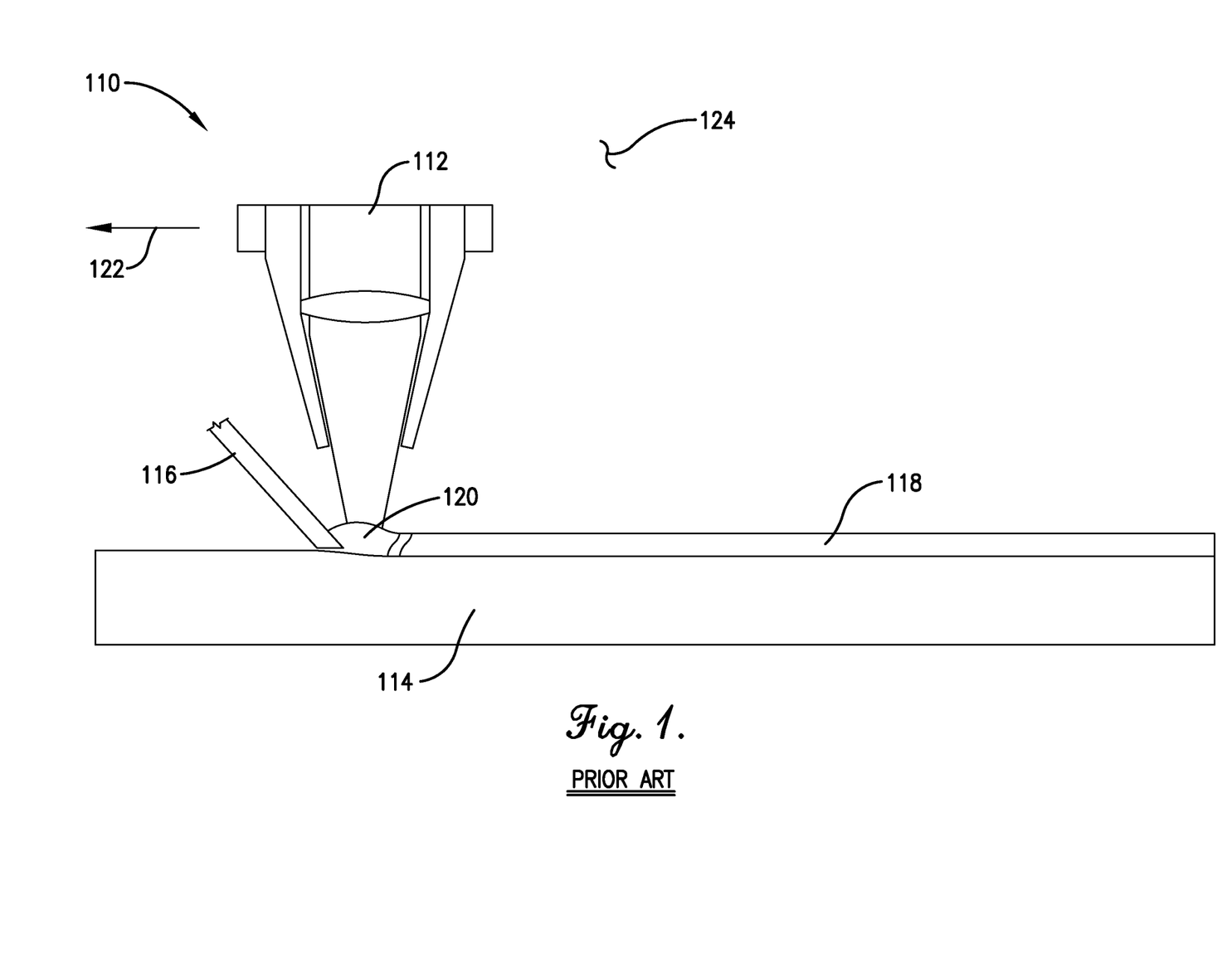
FIG. 1 is an elevation view of a prior art additive manufacturing system.

This will be more readily understood with reference to the accompanying figures. First, FIG. 1 shows an additive manufacturing system 110 used for a known directed energy deposition (DED) manufacturing process. The system 110 generally includes a deposition head including an energy source 112, a substrate 114, and a wire 116 used to form a deposition layer 118 of a component being manufactured. The substrate 114 is typically formed from the same metallic material as the wire 116, which has been formed via successive passes of the tooling over a work surface. Typically, the component being manufactured is modeled using a three-dimensional computer aided design (CAD) program or the like, and the three-dimensional model is divided into multiple substantially two-dimensional slices or strips. The system 110 builds up the component layer by layer by, for each layer, placing the wire 116 as dictated by the substantially two-dimensional strip and then heating and melting the wire 116 in place. The process is repeated for each layer until the three-dimensional component is fully formed.

More particularly, in FIG. 1 the substrate 114 has already been formed via multiple passes of the system 110 placing and heating the wire 116 according to the substantially two-dimensional slice of the three-dimensional model. At the instant shown in FIG. 1, an uppermost slice or deposition layer 118 is being formed by placing the wire 116 on the upward facing surface of the substrate 114 and by following the respective substantially two-dimensional slice of the three-dimensional CAD model. Simultaneous to placing the wire 116 in position, the energy source 112 heats and thus melts the wire 116 forming a melt pool 120 such that the wire 116, and more particularly the melted wire 116 in the melt pool 120, bonds with previous deposition layers (i.e., the substrate 114) and/or neighboring portions of the wire 116 that has already been placed according to the substantially two-dimensional slice.

In the depicted embodiment, the energy source 112 is a laser or similar energy source, and the deposition process may take place in a sealed deposition chamber 124 which may be a vacuum chamber or else a chamber filled with an inert gas. The energy source 112 is translated with respect to the substrate 114 (schematically shown by arrow 122) such that it generally follows the contour of the substantially two-dimensional slice of the three-dimensional model. Again, as the wire 116 cools and solidifies, it forms one deposition layer 118 of the component part. The process is then repeated for each subsequent layer or slice of the three-dimensional model such that the process builds up deposition layer upon deposition layer until the component is fully formed.

Generally, components formed via additive manufacturing, such as those formed by the system 110 shown in FIG. 1, exhibit reduced strength, corrosion resistance, and other mechanical properties as compared to more traditional manufacturing processes such as forging or the like. For example, when an additively manufactured component is formed from aluminum or similar alloy (that is, when the wire 116 forming each deposition layer 118 is an aluminum wire or similar), the slow cooling rates from joining or deposition temperatures results in the inability to achieve Super Saturated Solid Solution (SSSS) essential to achieve corrosion resistance and mechanical properties comparable wrought products. When an additively manufactured component is formed from other metal types, the additive manufacturing process shown in FIG. 1 is ineffective for achieving a solution treated condition for precipitation hardening alloys, martensite transformation for alpha-beta titanium alloys, retained beta for metastable beta titanium alloys, and solution annealed condition for 300 series stainless steels, and may in some instances result in precipitation of chromium carbide, which can adversely impact corrosion resistance. Similarly, for components formed from titanium, the slow cooling rates result in large prior beta grains with internal coarse microstructure that reduces fatigue life significantly. And in titanium, especially with fusion deposition methods, slow cooling rates after deposition result in large prior beta grains with internal coarse microstructure that reduces fatigue life significantly. The same mechanism would result in coarse grain structure for nickel base alloys, which can significantly reduce fatigue performance. Moreover, continuous deposition passes result in a large volume of deposit that is significantly hotter than the substrate and its surrounding material. The difference in temperature between the large deposited volume and the surrounding material results in excessive thermal stresses that often cause unwanted distortion in the deposited preform and can cause dimensional instability in downstream processes such as heat treatment or machining operations. In this regard, it is often necessary for the additively manufactured component to undergo re-solution treatment after formation.

Accordingly, it is known to heat treat fully formed additively manufactured components in an attempt to achieve mechanical properties similar to cast components or even wrought metal. However, this post-formation heat treatment can be expensive and time consuming. Moreover, these post-formation heat treatment processes may be effective for treating the outer surface of the component part but is ineffective for treating deeper portions of the component. Thus, notwithstanding the post-formation heat treatment processes, additively manufactured components still exhibit reduced strength and other mechanical properties as compared to components formed by forging or other traditional manufacturing processes.

Aspects of the invention overcome the deficiencies of the prior-art additive manufacturing processes by implementing a real-time, or in-situ, thermal management system at the deposition site or heat affected zone, particularly to provide solution heat treatment, thereby reducing defects in the deposition layer and thus resulting in an additively manufactured component having mechanical properties approaching that of wrought metal even without additional, post-formation heat treatment or other known processes. More particularly, aspects of the invention employ in-situ solution heat treatment and/or electro-plasticity or electromagnetic stirring to increase the mechanical properties of the additively manufactured component even without post-formation re-solution treatment or similar.

At a high level, "solution heat treatment" generally refers to heating an alloy to a suitable, predetermined temperature (i.e., the solution heat treatment temperature), and holding or soaking the alloy at that temperature for a suitable period of time in order to cause one or more of the constituents to enter into a solid solution. The alloy is then cooled at a sufficient and/or critical rate, sometimes by quenching or the like, in order to hold the constituents in the solution and thus avoid precipitation of the one or more constituents.

As used herein, solution heat treatment encompasses processes traditionally referred to as "solution heat treatment," but also encompasses other processes used to cause one or more of the constituents of an alloy to enter into a solid solution including processes traditionally referred to as "solution annealing" (particularly with respect to titanium) and "solution hardening" (particularly with respect to steel).

Aspects of the invention are directed to "in-situ solution heat treatment" of an additively manufactured component, which as used herein generally refers to solution heat treating (as that term is defined above) in real time, at the heat affected zone. This will be more readily understood with reference to the remaining figures.

Figure 2:
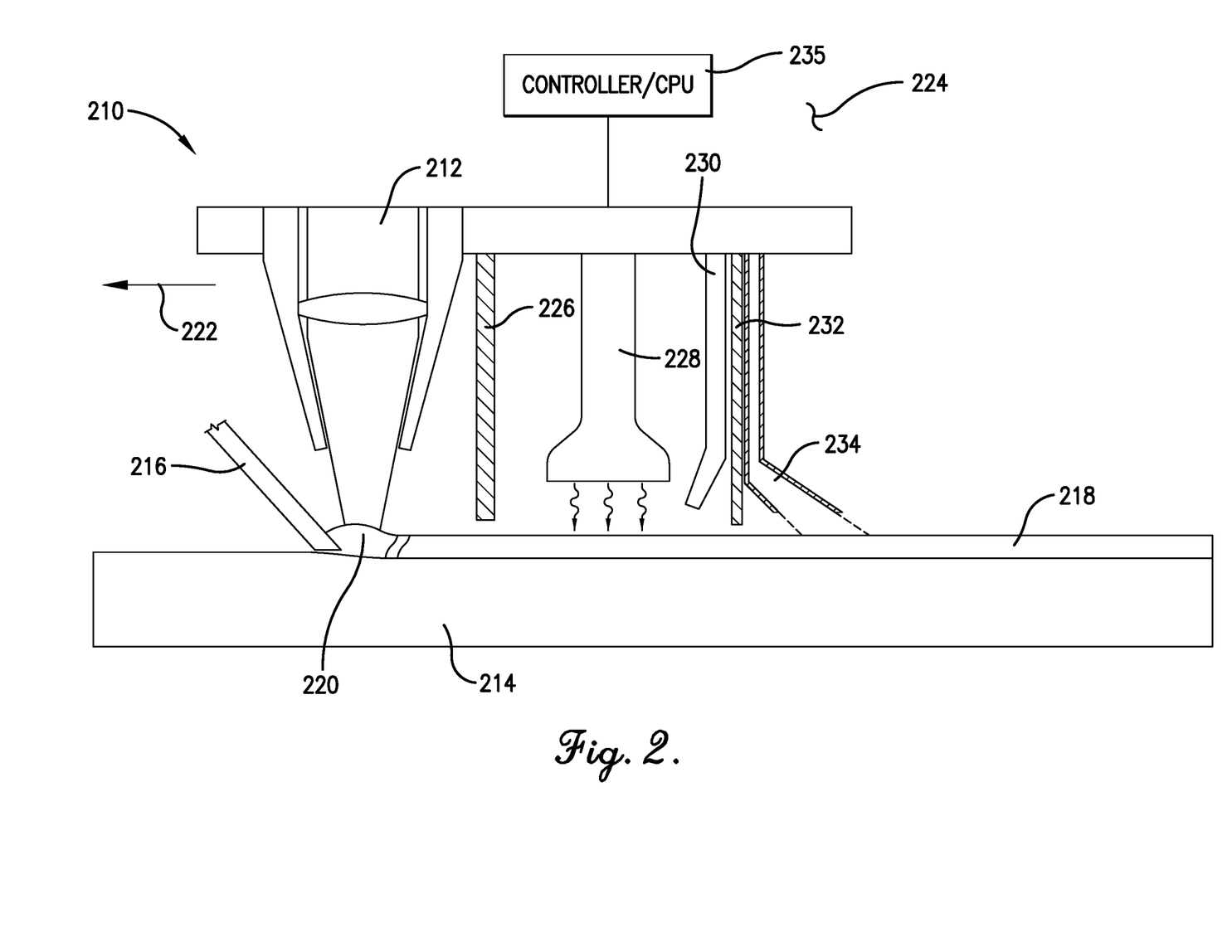
FIG. 2 is an elevation view of an additive manufacturing system according to a first embodiment of the invention.

First, FIG. 2 schematically shows an additive manufacturing system 210 used to manufacture and in-situ solution heat treat three-dimensional components according to a first embodiment of the invention. The system 210 generally includes a deposition head including an energy source 212, a substrate 214 forming part of the additively manufactured component, a wire 216 used to form the various deposition layers or slices 218 of the component, and in-situ solution heat treatment tooling components including, in this embodiment, a pair of electromagnetic shields 226, 232, a heat source 228, a temperature sensor 230, and a cooling source 234. In one non-limiting example the heat source 228 may be an induction heater, the temperature sensor 230 may be an infrared pyrometer, and the cooling source 234 may be a cryogenic spray nozzle. However, any other suitable heat source 228, temperature sensor 230, and/or cooling source 234 can be employed when in-situ solution heat treating the deposition layer 218 without departing from the scope of the invention. The system may include one or more controllers and/or central processing units (CPUs) 235 configured to control the various aspects of the system 210 including, without limitation, the operation of the energy source 212, heat source 228, temperature sensor 230, and/or cooling source 234, as well as movement of these components with respect to the substrate 214 as schematically represented by arrow 222.

Generally, the system 210 is used to build up a three-dimensional component layer by layer by depositing, heating, in-situ solution heat treating, and cooling each deposition layer until the component is fully formed. More particularly, in this embodiment the system 210 uses a wire 216 as the feedstock to form each deposition layer 218. The system 210—more particularly the energy source 212 and wire 216 applicator—follows the contours of a substantially two-dimensional slice of the three-dimensional CAD model as schematically shown by arrow 222. As used herein, a "substantially two-dimensional" slice or layer is used to refer to a layer that, although is three-dimensional in that it has a thickness in the Z or vertical direction, is nonetheless one that has a very small thickness and thus approaches a two-dimensional shape. That is, the thickness of each deposition layer is equal to that of the melted feedstock (in this case, melted wire 216) being added to form the deposition layer 218. In some embodiments, the thickness of each substantially two-dimensional deposition layer 218 may be between approximately 10 and 500 microns. Other thicknesses, or "resolutions" of the system 210, may be employed without departing from the scope of the invention.

As the wire 216 is placed on the substrate 214, the energy source 212 heats the wire 216 beyond its melting point, forming a melt pool 220. The energy source 212 may be any suitable energy source used in DED processes and in some embodiments may be one of a laser source, a plasma source, an electron beam source, a gas tungsten arc welding (GTAW) source, or other suitable energy source. Moreover, in some embodiments, the system 210 may be contained within a sealed deposition chamber 224, which may be a vacuum chamber, a chamber filled with an inert gas, or other suitable deposition chamber for operation of the energy source 212. It should be appreciated that due to its proximity to the energy source 212, an uppermost portion of the substrate 214 is also heated beyond its melt temperature and forms part of the melt pool 220, such that the melted wire 216 welds and bonds with the substrate 214, forming a deposition layer 218 of the three-dimensional component being manufactured.

In this embodiment, the deposition layer 218, and more particularly the heat affected zone of the deposition layer 218, undergoes in-situ solution heat treatment immediately after bonding to the substrate 214. More particularly, after bonding to the substrate 214 at the melt pool 220, a heat source 228—in this case an induction heater—is passed over the heat affected zone. As should be appreciated by those skilled in the art, the induction heater 228 utilizes electromagnetic waves to induce electrical currents within deposition layer 218 and substrate 214, thereby heating the component. In that regard, in some embodiments the system 210 may optionally include a plurality of electromagnetic shields 226, 232 or other shields to contain the electromagnetic waves to the portion undergoing the in-situ solution heat treatment process. In other embodiments more or less electromagnetic shields 226, 232 may be employed, and/or other suitable heat sources 228 such as an open flame, radiant heater, or the like may be utilized without departing from the scope of the invention. In embodiments implementing a heat source 228 other than an induction heater, the electromagnetic shielding 226, 232 may optionally be omitted altogether and/or other types of insulation or shielding may be utilized such as flame retardant shielding or the like without departing from the scope of the invention.

In some embodiments, the deposition layer 218 may be heated by the heat source 228 to a predetermined solution temperature and held at or above that predetermined solution temperature for a predetermined time in order to achieve the desired solution heat treatment benefits. For example, in some embodiments the solution temperature for aluminum alloys may be in the range 850-1025 degrees Fahrenheit. Although the precise solution temperature for aluminum would vary from alloy to alloy, the solution temperature satisfies the following criteria: (1) the solution temperature is below the incipient melting temperature for the alloy; and (2) the solution temperature is high enough, and the heat is applied for a long enough period of time, in order to dissolve coarse precipitates (solutes) formed during cooling from deposition or welding. In some embodiments, metallographic analysis can help achieve and validate the effectiveness of in-situ heat treatment parameters.

For titanium alloys, the solution temperature may be in the range 1400-1925 degrees Fahrenheit. More particularly, for alpha-beta solution heat treatment of alpha-beta titanium alloys, the solution temperature can be 50-200 degrees Fahrenheit below the beta transus temperature. For beta solution treatment of alpha-beta titanium alloy, the solution temperature can be the beta transus temperature plus 50-100 degrees Fahrenheit. For alpha-beta solution heat treatment of beta titanium alloys, the solution temperature can be the beta transus temperature minus 50-100 degrees Fahrenheit. And for beta solution heat treatment of beta titanium alloys, the solution temperature can be the beta transus temperature plus 50-250 degrees Fahrenheit. In any event, for titanium allows the solution temperature will not exceed limits set for solution treatment in AMS-H-81200.

For precipitation hardening stainless steels, the solution temperature may be in the range 1750-1950 degrees Fahrenheit. For such metals, the solution treatment temperature and heat application time should be sufficient to allow full dissolution of precipitates and effective transformation to the austenite phase, which can be validated by metallographic analysis. AMS-H-6875 provides guidelines for the solution treatment temperatures, transformation temperatures, cooling rates and restrictions for solution heat treatment of precipitation hardening corrosion resistant steels.

For austenitic corrosion resistant steels, the solution temperature may be in the range 1750-2050 degrees Fahrenheit. For such metals, the solution temperature and time shall be below incipient melting while being sufficient to dissolve chromium carbides at the grain boundaries and attain austenitic phase. AMS-H-6875 provides guidelines for heat treatment of this class of corrosion resistant steels.

For martensitic corrosion resistant steels, the solution temperature may be in the range 1750-1950 degrees Fahrenheit. For such metals, it may be beneficial to pre-heat the substrate prior to deposition to the sub-critical annealing temperature followed by deposition and post-deposition heat treatment to above austenite transformation temperature to achieve effective hardening upon quenching. This pre-heating step will be discussed in more detail with the various embodiments below.

And for nickel base alloys, the solution temperature may be in the range 1700-2200 degrees Fahrenheit. More particularly, the solution temperature for nickel base alloys will be below the incipient melting temperature, while being high enough to effectively dissolve precipitates formed during deposition due to insufficient post-deposition cooling stages in order to achieve solid solution condition.

In this regard, the system 210 may include a temperature sensor 230 such as, in one non-limiting example, an infrared pyrometer to ensure deposition layer 218 reaches the appropriate solution temperatures as described above. As should be appreciated, an infrared pyrometer is a contactless thermometer that measures the temperature on the surface of the deposition layer 218 by detecting an amount of thermal radiation being emitted by the deposition layer 218. However, contact temperature measurement methods can also be utilized for measuring temperature.

The temperature sensor 230 forms part of a feedback loop that can inform the speed of movement of the deposition head (schematically shown by arrow 222) and/or the amount of heat (e.g., electromagnetic energy) being applied by the heat source 228, which is generally controlled by the controller/CPU 235. More particularly, in response to the sensed temperature of the deposition layer 218 as determined by the temperature sensor 230, the deposition head speed is increased or decreased and/or the amount of heat emitted by the heat source 228 can be increased or decreased in order to achieve a sufficient in-situ solution heat treatment temperature for a sufficient period of time, achieving solution heat treatment benefits such as elimination of microstructural precipitation within the deposited alloy.

Following the in-situ solution heat treating of the deposition layer 218 via the heat source 228, the deposition layer 218 optionally can be cooled via a cooling source 234 such as, in the depicted embodiment, one or more cryogenic spray nozzles. This rapid cooling may help avoid the formation of precipitates in the deposition layer following the in-situ solution heat treatment by the heating source 228. The cooling source 234 causes rapid cooling of the deposition layer 218 and surrounding metal, solidifying the component.

In some embodiments the deposition layer 218 may be cooled or quenched to any temperature below room temperature. In other embodiments, such as, for example, additive manufacturing processes employing quench-brittle alloys such as ultra-high strength alloy and carbon steels, a minimum temperature may be maintained via heating during quenching to a safe threshold above the martensite finish temperature. Typically, the temperature in such instances ranges from 100 to 400 degrees Fahrenheit, depending on the alloy. Maintaining a minimum temperature in this manner may also beneficially result in in-situ aging for aluminum alloys.

By way of example, for aluminum alloys the cooling temperature, or "target temperature," may be in a range from −50 to 200 degrees Fahrenheit, and the cooling time may be in the range of 1 to 15 seconds. Moreover, the deposition layer 218 may be cooled at a rate of 50-1000 degrees Fahrenheit per second (i.e., the "critical cooling rate" for aluminum alloys). More generally, such alloys are quenched to a temperature in the two-phase region (such as room temperature (RT), which for purposes of this disclosure is approximately 70 degrees Fahrenheit) at fast enough rates to retain a supersaturated solid solution (SSSS) condition and allow subsequent aging to desired temper condition. The solution heat treatment temperatures, cooling rates, temperatures, aging temperatures, and restrictions for such alloys are specified in AMS 2770 (Heat Treatment of Wrought Aluminum Alloy Parts).

For titanium alloys the target temperature may in a range from approximately RT-900 degrees Fahrenheit, and the cooling time may be in the range of 1 to 600 seconds. Moreover, the deposition layer 218 may be cooled at a rate of 1-1000 degrees Fahrenheit per second (i.e., the "critical cooling rate" for titanium alloys). More generally, for alpha-beta titanium alloys, the deposition layer 218 is cooled fast enough to below Martensite start temperature. For beta titanium alloys, the deposition layer 218 is cooled fast enough to attain retained beta phase, with the cooling rate falling outside of the 1-1000 degrees Fahrenheit per second, but still fast enough to retain beta phase upon quenching. Specific guidance for heat treat treatment temperatures and cooling rates can be found in AMS-H-81200.

For precipitation hardening stainless steels the target temperature may in a range from −100 degrees Fahrenheit to approximately RT, and the cooling time may be in the range of 1 to 900 seconds. Moreover, the deposition layer 218 may be cooled at a rate of 1-1000 degrees Fahrenheit per second (i.e., the "critical cooling rate" for precipitation hardening steels). More generally, for such metals the cooling rate and target temperature shall be sufficient to achieve effective martensitic transformation by cooling to below Martensite finish temperature. AMS-H-6875 provides guidelines for the solution treatment temperatures, transformation temperatures, cooling rates and restrictions for solution heat treatment and subsequent aging of precipitation hardening corrosion resistant steels.

For austenitic corrosion resistant steels, the target temperature may be −100 degrees Fahrenheit to approximately RT, and the cooling time may be in the range of 1 to 900 seconds. Moreover, the deposition layer 218 may be cooled at a rate of 1-1000 degrees Fahrenheit per second (i.e., the "critical cooling rate" for austenitic corrosion resistant steels). More generally, the cooling rate shall be fast enough to avoid precipitation of chromium carbides at the grain boundaries and allow precipitation of stable carbides upon subsequent stabilization heat treatment for stabilized austenitic corrosion resistant steels.

For martensitic corrosion resistant steels, the target temperature may be in the range of approximately RT-250 degrees Fahrenheit, and the cooling time may be in the range of 1 to 60 seconds. Moreover, the deposition layer 218 may be cooled at a rate of 30-1000 degrees Fahrenheit per second (i.e., the "critical cooling rate" for martensitic corrosion resistant steels). More generally, the cooling from solution treatment/hardening temperature shall be fast enough to achieve martensitic transformation when quenched to below martensite finish temperature. Moreover, for such metals sub-zero cooling may be employed if/as required by AMS-H-6875.

Finally, for nickel base alloys, the target temperature may be in the range of approximately RT-1000 degrees Fahrenheit, and the cooling time may be in the range of 1 to 900 seconds. Moreover, the deposition layer 218 may be cooled at a rate of 1-1000 degrees Fahrenheit per second (i.e., the "critical cooling rate" for nickel base alloys). More generally, the cooling from solution treatment temperature shall be fast enough to retain constituents in solid solution for subsequent precipitation hardening treatment.

When the cooling source 234 is a cryogenic spray nozzle or similar, any desired cooling gas may be implemented. That is, different methods of cooling might be required for different alloy systems and metal additive technologies. For example, when titanium is heated above 1000 degrees Fahrenheit, it reacts with oxygen, nitrogen, water vapor, and carbon-containing gases. Such reactions may result in surface interstitial element enrichment, which can severely reduce toughness and ductility. For titanium alloys heated to above 1000 degrees Fahrenheit, as for all fusion additive processes and some solid-state joining or additive manufacturing processes, a cryogenic inert gas may be employed such as liquid argon, helium, or a mixture as the quench media. Alternatively, cryogenic nitrogen may be used for protecting and quenching aluminum alloys and most types of steels. Rapid carbon dioxide ($CO_2$) cooling, as used for improving machining and drilling efficiencies, also offers a practical alternative to inert gas quenching of alloys and processes that can be deposited or joined at lower temperatures.

Still more, for fusion additive processes such as plasma deposition, electron beam deposition, Gas Tungsten Arc Welding, or Gas Metal Arc Welding, the deposition layer 218 may be cryogenically cooled with nitrogen or argon, as two non-limiting examples. For metal additive processes done via solid state bonding such as in Friction Stir Metal Additive, rapid $CO_2$ cooling may be used instead as one non-limiting example.

The rapid cooling further serves to strengthen the component and provide increased corrosion resistance, among other benefits. More particularly, lowering the heated mass by progressive and incremental solution heat treating and quenching lowers thermal stresses and helps mitigate distortion, resulting in more dimensionally stable builds. In some embodiments, additional cooling sources (e.g., additional cryogenic spray nozzles) can be provided beneath the component (that is, underneath the substrate 214), which in turn can be synchronized with the cooling source 234 for simultaneous spray and cooling above and below the component being manufactured. This in turn may beneficially increase the cooling rate of the component and thus avoid defects and improve corrosion resistance and other mechanical properties.

By in-situ solution heat treating and quenching the component during additive manufacturing as described above, the system 210 can beneficially attain super saturated solid solution (SSSS) for aluminum alloys, solution treated condition for precipitation hardening alloys, Martensite transformation for alpha-beta titanium alloys, retained beta for metastable beta titanium alloys, or solution annealed condition for 300 series stainless steels, while avoiding precipitation of chromium carbide which can adversely impact corrosion resistance. Although not shown in FIG. 2, and as will be discussed in more detail below with respect to FIG. 6, in addition to controlling microstructure and the phases within the grain and the grain boundary via in-situ solution heat treatment, some embodiments can implement electromagnetic stirring of the melt pool to refine the grain structure of the component during deposition.

Figure 3:
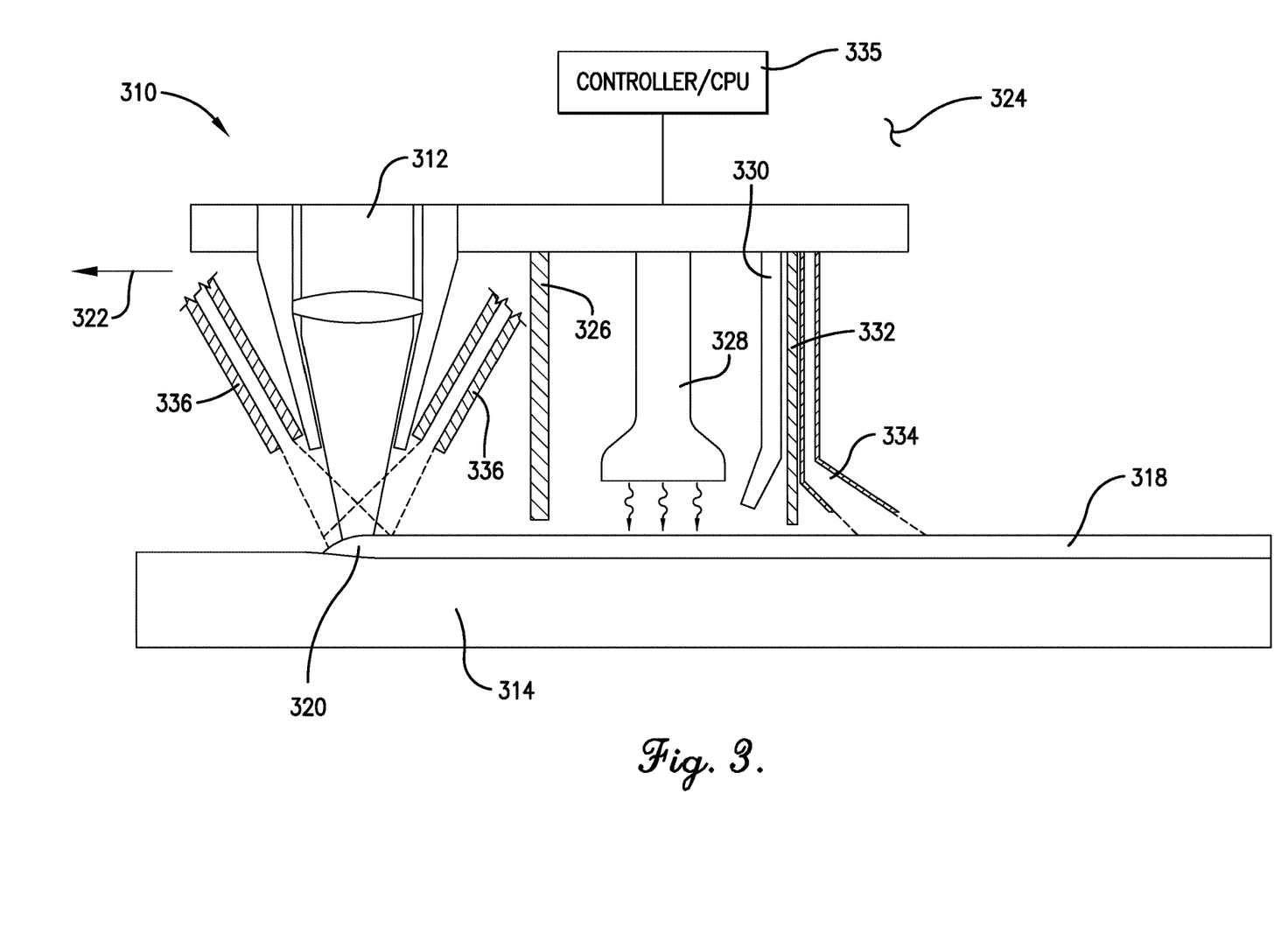
FIG. 3 is an elevation view of an additive manufacturing system according to a second embodiment of the invention.

Although in FIG. 2 the system 210 employs a wire-based DED process, the invention is not limited to such additive manufactured processes and other additive manufacturing processes can be used in connection with the in-situ solution heat treatment principles discussed herein without departing from the scope of the invention. For example, FIG. 3 shows system 310 that implements a metallic powder additive process according to an embodiment of the invention. Like the system 210 discussed in connection with FIG. 2, the system 310 in this embodiment generally includes a deposition head including an energy source 312, a sealed deposition chamber 324, a pair of electromagnetic or other shields 326, 332, a heat source 328 such as an induction heater, a temperature sensor 330 such as an infrared pyrometer, a cooling source 334 such as a cryogenic spray nozzle, and a controller or CPU 335 controlling the operation of the various components including movement of the system components as schematically illustrated by arrow 322. Each of these components are similar to the like-named components discussed in connection with FIG. 2, and thus will not be discussed again in detail.

In this embodiment, however, rather than using a wire 216 to form the deposition layer 218 as discussed in connection with the system 210 shown in FIG. 2, the deposition layer 318 is formed on the substrate 314 from a metallic powder. That is, the system 310 in this embodiment includes a powder injection nozzle 336 proximate a tip of the energy sources 312. The powder injection nozzle 336 injects a metallic powder on the substrate 314, which is heated and melted by the energy source 312 forming the melt pool 320. In some embodiments the metallic powder may carried through the powder injection nozzle via a shroud gas.

In a like manner as discussed above with respect to FIG. 2, the system 310 (and more particularly the energy source 312 and the powder injection nozzle 336) via operation of the controller or CPU 335 generally follows the contour of a substantially two-dimensional slice of the three-dimensional CAD model (as schematically shown by arrow 322) while applying metallic powder via the powder injection nozzle 336 to the substrate 314. The energy source 312 heats the powder and surrounding substrate 314 forming a melt pool 320 such that the powder and surrounding substrate 314 generally melds and bonds together, forming a deposition layer 318 of the component being additively manufactured.

The deposition layer is then in-situ solution heat treated and quenched via the heat source 328 (in the depicted embodiment, an induction heater) and cooling source 334 (in the depicted embodiment, a cryogenic spray nozzle), respectively. Again, other heat or cooling sources may be employed without departing from the scope of the invention. And optionally one or more additional cooling sources (e.g., cryogenic spray nozzles) could be provided underneath the component to provide simultaneous quenching from both above and below the component, as discussed above in connection with FIG. 2.

Still other types of additive manufacturing tooling and associated in-situ solution heat treatment components can be utilized without departing from the scope of the invention. For example, aspects of the in-situ solution heat treatment process could be implemented in a friction stir additive manufacturing process or any other desired additive manufacturing process. Moreover, additional heat sources (e.g., induction heaters) could be added to in-situ solution heat treat the deposition layers, including heat sources configured to heat the substrate prior to adding feedstock or filler material forming a deposition layer. Still more, additional heater(s) may be provided to heat the feedstock or filler material itself prior to the material being added to the substrate in order to create a thermally managed heat affected zone and thus provide enhanced mechanical properties and other benefits of the fully formed additively manufactured component.

Figure 4:
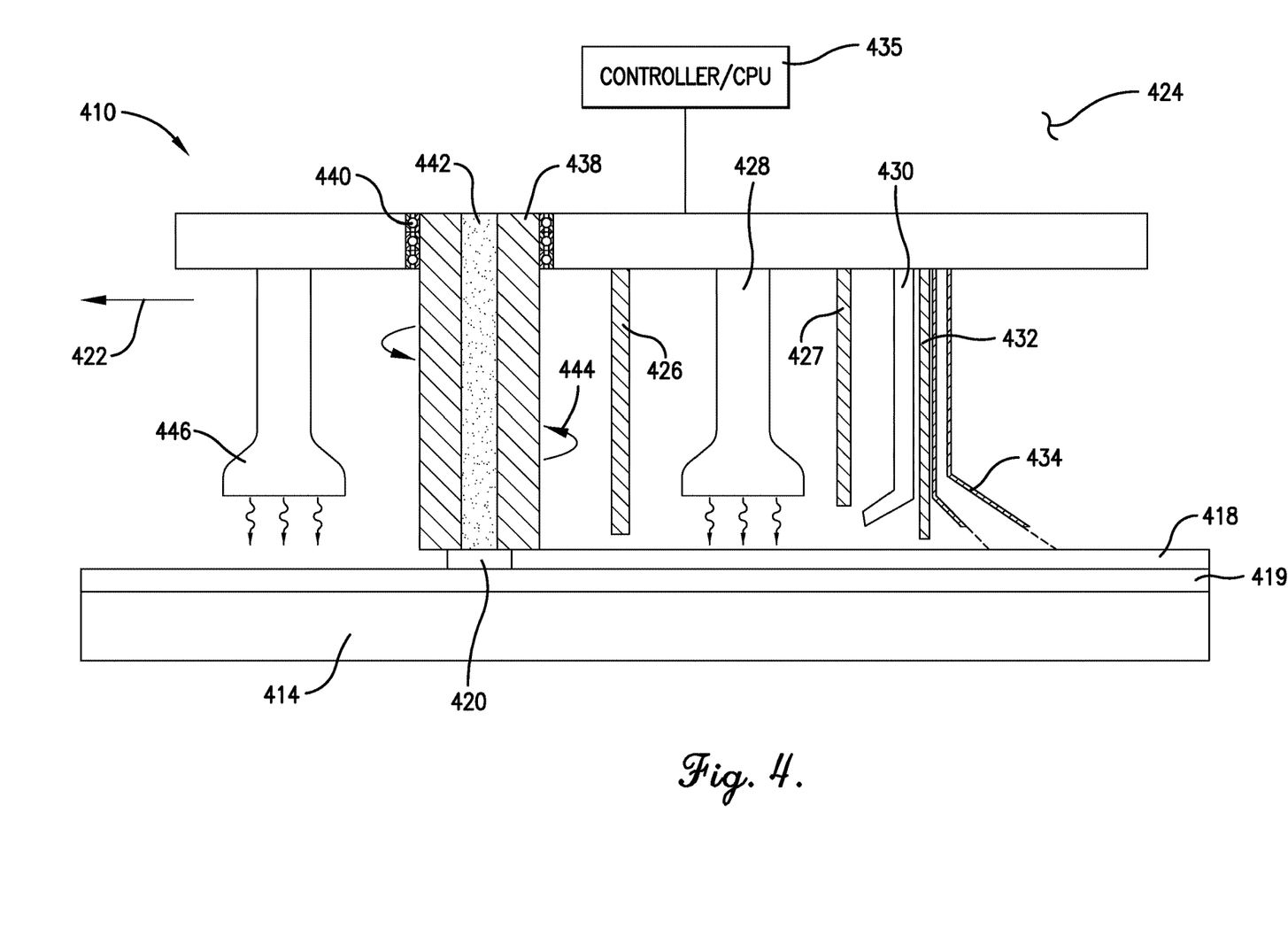
FIG. 4 is an elevation view of an additive manufacturing system according to a third embodiment of the invention.
Figure 5:
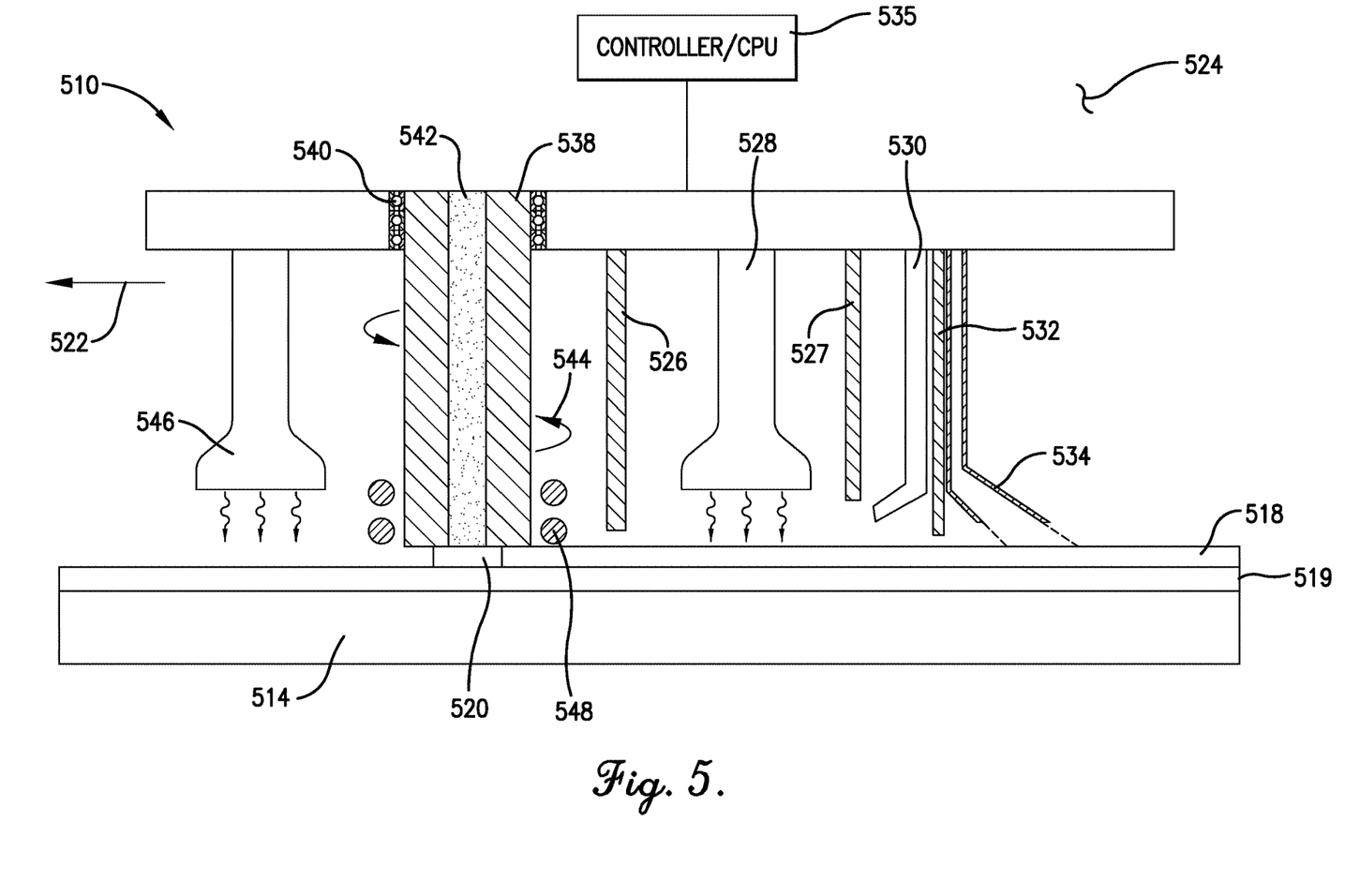
FIG. 5 is an elevation view of an additive manufacturing system according to a fourth embodiment of the invention.

This will be more readily understood with reference to FIGS. 4 and 5. First, FIG. 4 shows an additive manufacturing system 410 and associated in-situ solution heat treatment tooling that employs a friction stir additive manufacturing process as well as multiple heat sources 428, 446 (in the depicted embodiment, induction heaters) according to aspects of the invention. Like the systems 210, 310 discussed in connection with FIGS. 2 and 3, the system 410 in this embodiment generally includes a sealed deposition chamber 424, a pair of electromagnetic or other shields 426, 432, a heat source 428 such as an induction heater, a temperature sensor 430 such as an infrared pyrometer, a cooling source 434 such as a cryogenic spray nozzle, and a controller or CPU 435 configured to control the various aspects of the system 410 including movement of the deposition head and associated in-situ solution heat treatment tooling as schematically shown by arrow 422. Each of these components are similar to the like-named components discussed in connection with FIGS. 2 and 3, and thus will not be discussed again in detail.

In this embodiment, the system 410 includes an additional electromagnetic shield 427 provided between the temperature sensor and the heat source 428 as an illustrative example of where additional shielding may be provided. More or less electromagnetic shields can be implemented without departing from the scope of the invention.

Moreover, in this embodiment rather than using an energy source to heat and melt the feedstock, the system 410 implements a friction stir welding process and thus heats and welds the feedstock to the substrate 414 via friction stirring. More particularly, the system includes a hollow shoulder 438 rotatably supported via ball bearings 440 or other suitable bearing. Filler material (e.g., metallic powder, metallic rod, or similar) is provided to the hollow interior channel of the rotating shoulder 438, which in turn directs the powder to the uppermost surface of the substrate 414 in a controlled manner. As the system 410 moves (schematically shown via arrow 422) following the substantially two-dimensional slice of the three-dimensional model, the rotating shoulder 438 rotates at a high rate, schematically shown by arrow 444, creating heat at the deposition zone and thus a deposit 420. The heated filler matter 442 thus welds to the surrounding substrate 414 creating a deposition layer 418 of the component. It should be appreciated, however, that in other embodiments different types of additive manufacturing processes (such as DED or otherwise) could be implemented in place of the friction stir welding method shown in FIG. 4 without departing from the scope of the invention. Moreover, in other embodiments the rotating shoulder 438 may be a solid component and the filler material 442 may be deposited via a separate nozzle or the like.

As discussed above with respect to FIGS. 2 and 3, the deposition layer 418 undergoes in-situ solution heat treatment via a heat source 428 (e.g., induction heater) immediately after being deposited in order to increase the strength and other mechanical properties of the additively manufactured component. The heat source 428 may again be provided in a feedback loop with a temperature sensor 430 (e.g., infrared pyrometer) to ensure the deposition layer 418 reaches a predetermined temperature for a predetermined amount of time, as discussed. And a cooling source 434 (e.g., cryogenic spray nozzles) may be provided to quench and cool the component after it has been in-situ solution heat treated, as discussed. In addition, there may be multiple heating/cooling nozzles coming from strategic locations relative to the deposition (e.g. from below, or from the sides) to achieve more efficient and uniform heat extraction. The relative location and timing of the heating/cooling actions can be optimized for the specific system based on the heat generated, alloy characteristics, quench sensitivity, the intended stress state, and the desired final microstructure. Finite element analysis (FEA) modeling can be used alone or in combination with physical trials to optimize the process.

In this embodiment, the substrate 414, and more particularly the uppermost layer 419 of the substrate, is heated prior to receiving the filler material in order to achieve additional thermal management benefits at the heat affected zone. More particularly, a second heat source 446, which in the depicted embodiment is an induction heater but which could be any other desired heat source without departing from the scope of the invention, is provided upstream of the rotating shoulder 438. The second heat source 446 heats the uppermost portion of the substrate 414 such as the immediately preceding substantially two-dimensional layer 419 of the component. Preheating the layer 419 prior to deposition of the next layer 418 reduces the thermal disparity in the heat affected zone, thus further reducing defects and other thermally induced stresses.

More particularly, the implementation of a real-time, or in-situ, thermal management system such as that described in connection with FIG. 4 reduces the thermal gradient between the substrate and the deposit by preheating the volume ahead of the deposition to a consistent temperature. This effect, combined with the incremental solution treatment and subsequent quenching of the localized heat-treated zone, significantly reduces the volume of hot metal that is surrounded by cold material at any given time. In this regard, embodiments of the invention engineer and/or control both the macrostructure and microstructure during and after deposition in order to achieve optimum combination of desired properties. Benefits may include fine and uniform grain structure, reduced anisotropy in mechanical properties, more homogeneous chemistry through reduced micro and macro segregation, reduced residual stresses, improved strength without compromising toughness, and improved durability without comprising residual strength. An added benefit of in-situ solution heat treatment is the ability to effectively avoid the limitations of conventionally heat treating large section sizes, which cannot extract heat quickly enough to achieve an optimal balance of strength, durability, and toughness. Moreover, incremental and progressive preheating, solution heat treatment, and quenching at controlled temperatures can significantly reduce variability within the part that may otherwise exist as a function of location, as well as part-to-part variability, resulting in a much more consistent and repeatable process.

In some embodiments the filler material itself may be additionally heated, or preheated, prior to deposition. This will be more readily understood with reference to FIG. 5, which shows additive manufacturing system 510 according to a fourth embodiment of the invention. This embodiment employs a friction stir welding additive manufacturing process, but as should be appreciated from the above discussion aspects of this embodiment could be implemented on any desired type of additive manufacturing process. Much like the embodiment described in connection with FIG. 4, the additive manufacturing system 510 operates in a deposition chamber 524 and includes a rotating shoulder 538 supported by ball bearings 540 or other bearing. The system 510 further includes a pair of heaters 528, 546, which in the depicted embodiment are induction heaters, a plurality of electromagnetic shield 526, 527, 532, a temperature sensor 530 such as an infrared pyrometer or other suitable sensor, a cooling source 534 such as a cryogenic spray nozzle, and a controller or CPU 535 configured to control the various aspects of the system 510 including movement of the deposition head and associated in-situ solution heat treatment tooling as schematically shown by arrow 522. Each of these components functions similar to the like-named components discussed above and thus will not be discussed again in detail.

This embodiment, however, includes a third heat source 548, which is the depicted embodiment is a coil induction heater provided around the outlet end of the rotating shoulder 538. The heat source 548 (e.g., coil induction heater) heats the filler material 542 prior to deposition on the substrate 514, and more particularly the uppermost layer 519 of the substrate 514. By preheating the uppermost layer 519 and the filler material 542 prior to melding the filler material 524 to the uppermost layer 519 via the deposit 520, the temperature gradient between each component is further reduced, which may beneficially reduce stresses and increase strength of the deposition layer 518. The layer 518 may further undergo the in-situ solution heat treatment (via heater 528) and quenching (via cooling source 534) to realize the additional solution heat treat benefits discussed herein.

In other embodiments of the invention, principles of electro-plasticity are applied concurrent with a deposition process in order to achieve increased mechanical properties as compared to traditional manufacturing processes. As used herein, electro-plasticity refers to the application of pulsed DC or AC current into the component being formed and/or into the tooling used to form the component, which induces an electron flow within the component being manufactured. The electron flow induced within the component being manufactured may result in enhanced mechanical properties of the component including, without limitation, reduced buildup of residual stresses, reduction in the tendency towards work hardening, and reduction in the level of stored strain energy, among others.

Figure 6:
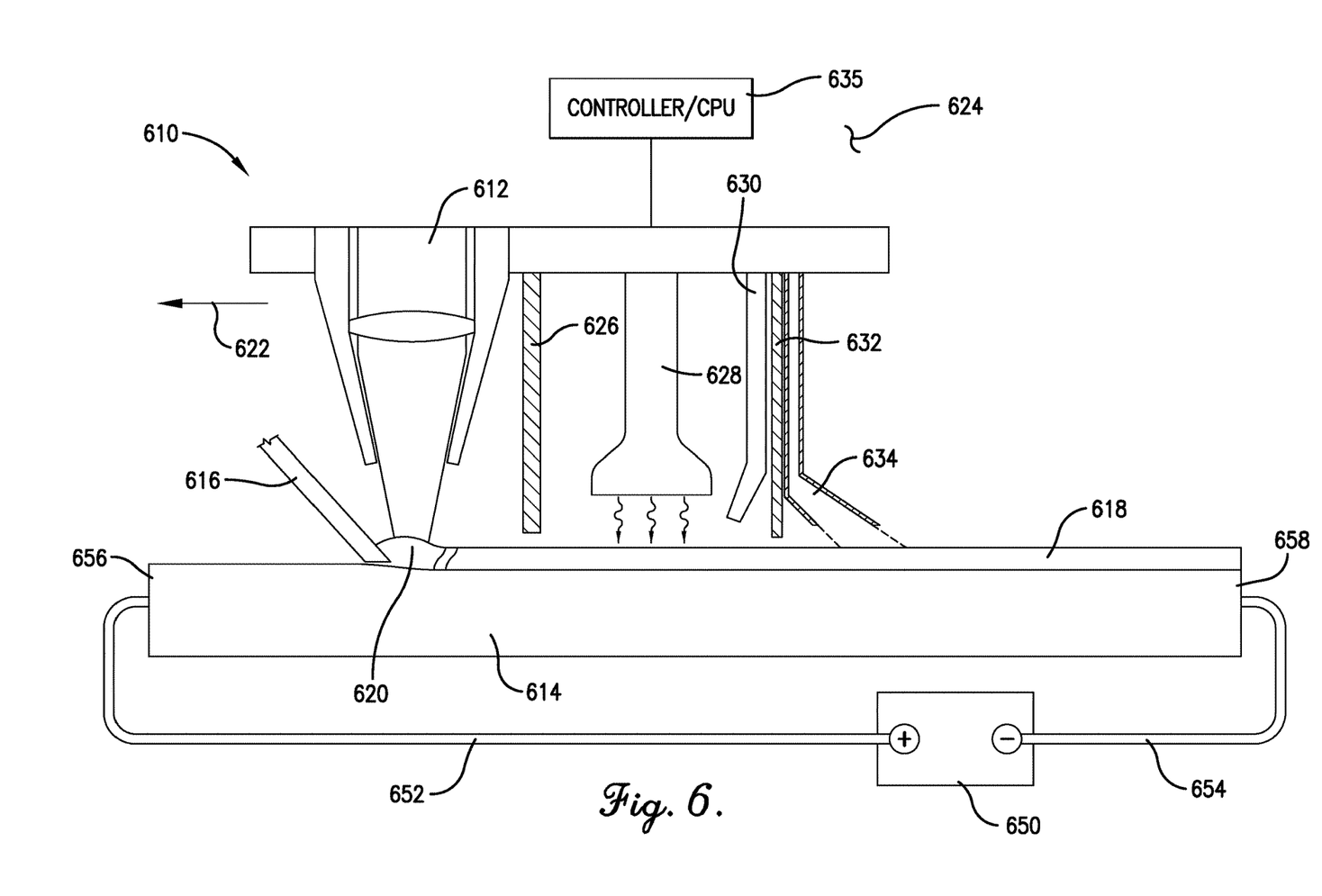
FIG. 6 is an elevation view of an additive manufacturing system according to a fifth embodiment of the invention.

This may be more readily understood with reference to FIG. 6. FIG. 6 shows system 610 that implements a wire based DED process according to an embodiment of the invention. Again, although aspects of this embodiment are discussed in connection with a wire-based DED process, the features described herein are not limited to such a process and could be implemented in other additive manufacturing processes such as those discussed in connection with systems 310, 410, and 510, or others. Like the system 210 discussed in connection with FIG. 2, the system 610 in this embodiment generally includes a deposition head including an energy source 612, a wire 616 or similar feedstock, a sealed deposition chamber 624, a pair of electromagnetic or other shields 626, 632, a heat source 628 such as an induction heater, a temperature sensor 630 such as an infrared pyrometer, a cooling source 634 such as a cryogenic spray nozzle, and a controller or CPU 635 controlling the operation of the various components including movement of the system components as schematically illustrated by arrow 622. Each of these components are similar to the like-named components discussed in connection with the above figures, and thus will not be discussed again in detail. Again, more or less heat and/or cooling sources could be employed, as should be appreciated in light of the discussion accompanying FIGS. 3-5, above.

System 610 further includes a voltage or other electromagnetic source 650 used to induce electron flow within the component being manufactured and/or within the various tooling or worktop used to create the component. The source 650 can include a positive lead 652 and a negative lead 654, which are operatively connected to a first end 656 of the substrate 614 and/or tooling and an opposing second end 658 of the substrate 614 and/or tooling, respectively. By connecting the positive and negative leads to opposing ends of the substrate 614 and/or tooling, a pulsed current (i.e., electron flow) is induced within the component being formed resulting in electromagnetic stirring of the melt pool 620. Such stirring can cause fragmentation of dendrites during solidification, resulting in formation of new nuclei (copious heterogeneous nucleation) in order to achieve grain refinement. Thus, this electromagnetic stirring, with or without the in-situ solution heat treatment processes described herein, may provide further mechanical benefits to the ultimately formed component as compared to known additively manufactured processes.

For example, the electro-plasticity aspects described herein may reduce the buildup of residual stresses during and after deposition, thereby reducing distortion and dimensional nonconformance via the combined effects of Joule heating, enhanced dislocation motion, and de-pinning of dislocations via the electron-wind force/dislocations interaction. This aspect is applicable to nearly all alloys and forms of deposition described in previous embodiments (stirring the melt pool for fusion based welding or additive manufacturing processes, as well as reducing flow stresses and work hardening effects during solid state deposition processes such as friction stir additive manufacturing process). The electro-plasticity aspects may also help achieve adequate substrate pre-heat level via Joule heating for deposition or welding of medium carbon martensitic carbon and alloy steels, in which slight increase in temperature above the Martensite start and finish temperatures could help reduce the tendency for cracking, and for other alloys it might aid bonding of the deposit to the previous deposits or the substrate.

Electro-plasticity also helps reduce the tendency towards work hardening, and it reduces the level of stored strain energy through the combined effects of limited Joule heating, and de-pinning of dislocations via the electron-wind force/dislocations interaction. This aspect of invention is especially useful, but not limited to use for solid state welding or deposition methods for alloys such as aluminum, which could require post deposition solution treatment. Minimizing work hardening, reducing the stored strain energy, and minimizing dislocation density via electro-plasticity would take out the stored energy that otherwise upon subsequent solution treating can result in abnormal grain growth for aluminum parts made by solid state deposition or welding methods. This effect would minimize the tendency towards grain growth in subsequent thermal processes.

The electron flow when controlled by optimizing current density, frequency, polarity manipulation, and pulsing parameters can work in conjunction with optional electromagnetic stirring, or as an alternative to electromagnetic stirring as an effective method to result in dendritic fragmentation and formation of copious heterogeneous nucleation of new grains, which is particularly effective for grain refinement of additively manufactured parts made via melt pool (fusion) processes. The benefit of electromagnetic stirring or the application of electro-plasticity during deposition is grain refinement and the refinement of macrostructure, which when followed by in situ solution heat treatment as described in other embodiments of this invention is that can result in combined refinement of both macro and microstructures. Attainment of effective and simultaneous refinement and control of both macrostructure and microstructure is essential for attaining optimum combination of static, durability and damage tolerance properties. Thus, this embodiment, although can be applied in standalone basis, is best applied as an integral part of the invention in conjunction with in-situ solution heat treatment.

Figure 7:
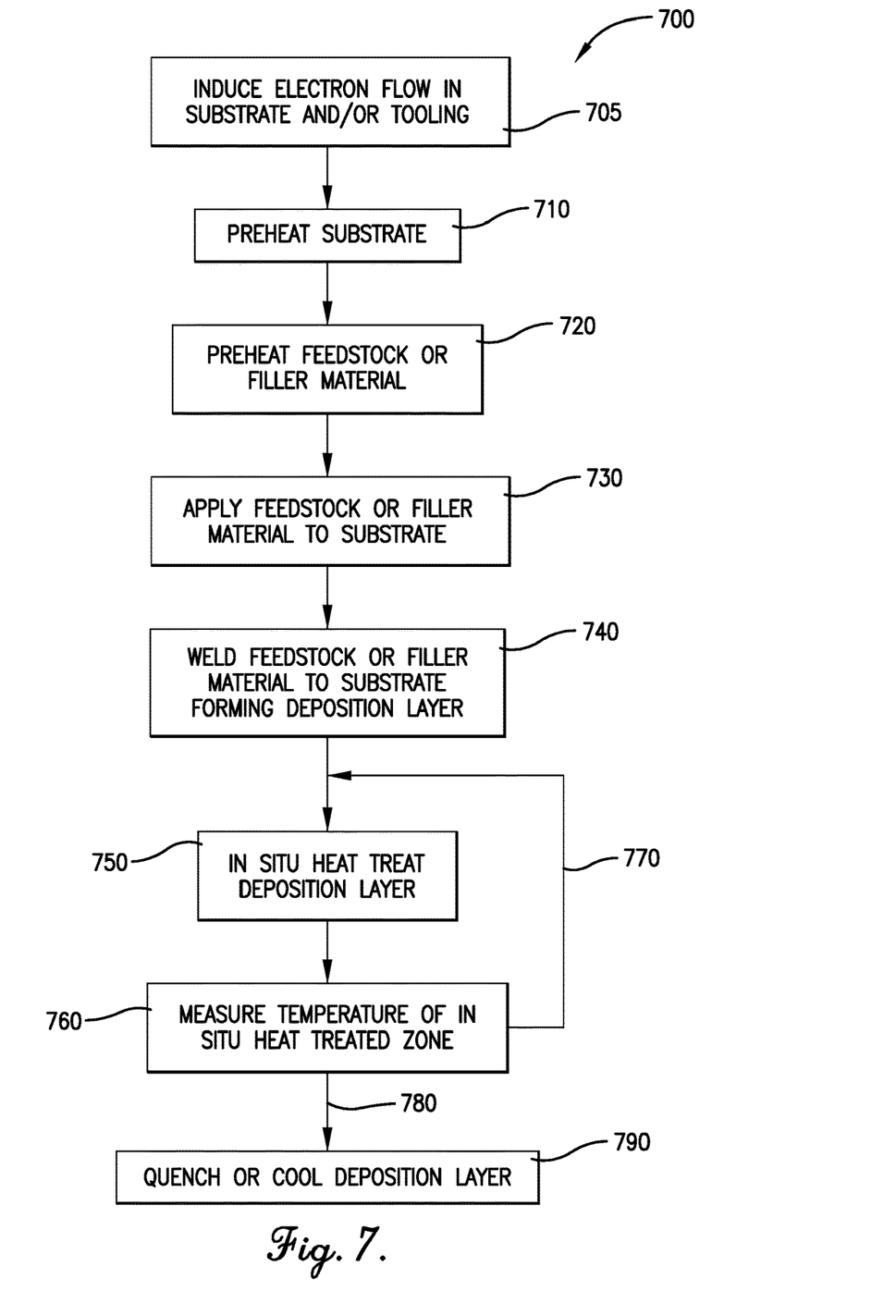
FIG. 7 is a flowchart representing an additive manufacturing process according to aspects of the invention.

FIG. 7 shows a flowchart 700 for a method of additive manufacturing a metallic component according to aspects of the invention. In some embodiments, the method may be carried out via a controller, CPU, or similar such as the controllers/CPUs 235, 335, 435, 535, and 635 discussed in connection with FIGS. 2-6 above.

At step 705, tooling used to support an additively manufactured component such as a worktop or similar, and/or a portion of the component itself such as the substrate described herein, is optionally connected to a voltage source. As discussed above in connection with FIG. 6, connecting the tooling and/or substrate to a voltage source induces electron flow within the component being manufactured, thus beneficially improving mechanical properties thereof via principles of electro-plasticity.

At step 710, a substrate (i.e. a portion of an additively manufactured component) is optionally preheated, as was discussed above in connection with heater 546. In some embodiments, the preheating is performed using an induction heater, which utilizes electromagnetic waves to induce electrical currents within deposition layer and substrate, thereby heating an uppermost portion of the substrate prior to depositing a filler material or feedstock thereupon. As discussed, this reduces the temperature gradient among the various materials and layers proximate the heat affected zone, which in turn reduces defects and stresses thereby increasing the mechanical properties of the additively manufactured component.

At step 720, the feedstock or filler material to be added to the substrate is optionally preheated such as by use of an induction heater similar to the coil induction heater 548 discussed above. As should be appreciated from the above discussion, in some embodiments the feedstock or filler material may be a wire, in other embodiments the feedstock or filler material may be a metallic powder, and in still other embodiments the feedstock or filler material may be any other desired material used in known additive manufacturing processes.

At step 730, the feedstock or filler mater (which may optionally be preheated via step 720) is deposited on the substrate. Again, this may be performed via a wire feed mechanism for a wire-based additive manufacturing processing, a hollow rotating shoulder for a friction stir welding additive manufacturing process, a powder injection nozzle for a powder based additive manufacturing process, or any other suitable mechanism for carrying out other additive manufacturing processes. The feedstock or filler material is applied following the contour of a substantially two-dimensional slice or layer of a three-dimensional model of the additively manufactured component, as discussed.

At step 740 the feedstock or filler material is welded or otherwise melded to the substrate forming a portion of the deposition layer; i.e., forming a portion of the substantially two-dimensional slice of the three-dimensional component. For DED additive manufacturing processes, this may be accomplished by heating the wire, metallic powder, or other feedstock or filler material beyond the melting point via an energy source (a laser source, a plasma source, an electron beam source, a gas tungsten arc welding (GTAW) source, or other suitable energy source). For friction stir welding processes, this may be accomplished via heat formed by the friction between a rotating shoulder or the like and the filler material. And in embodiments employing the principles of electro-plasticity as discussed above in connection with FIG. 6 and step 705, the heat affected zone and/or melt pool may be electromagnetically stirred at this step via the electron flow induced within the component. The deposited feedstock or filler material is then welded to the substrate as it cools and solidifies, forming an uppermost layer of the component being manufactured, as discussed.

At step 750, the deposition layer undergoes in-situ solution heat treatment in the heat affected zone (i.e., an area of the layer proximate the melt pool). In some embodiments, this may be accomplished by heating the deposition layer via an induction heater, such as heaters 228, 328, 428, 528, and 628 discussed above in connection with FIGS. 2-6. In other embodiments, other heat sources or heaters may be employed to in-situ solution heat treat the deposition layer including, for example, an open flame, a radiant heater, or other source.

In some embodiments, the deposition layer may be solution heat treated to a predetermined solution temperature for a predetermined period of time in order to achieve the desired heat treatment benefits. In such embodiments, the temperature of heat affected zone may be measured at step 760 via an infrared pyrometer or other temperature sensor, as discussed.

The temperature may form part of a feedback loop to ensure that the deposition layer undergoes sufficient heat treatment. For example, if the temperature reading at step 760 indicates that the portion of the deposition layer being heat treated has not reached the predetermined solution temperature and/or has not been above the predetermined solution temperature for the predetermined period of time, then the process will continue to in-situ solution heat treat the portion of the deposition layer, as schematically represented by arrow 770. This may be accomplished by, for example, slowing the movement of the tooling or otherwise to allow the deposition layer to remain proximate the induction heater for an extended period of time. However, if the temperature reading at step 760 indicates that the portion of the deposition layer being heat treated has reached the predetermined solution temperature and has been above the predetermined solution temperature for the predetermined period of time, then the process will continue as schematically represented by arrow 780.

Finally, following the in-situ solution heat treatment the deposition layer is subsequently cooled at step 790. Optionally, in some embodiments the deposition layer may be cooled and/or quenched prior to (or even in lieu of) one or more of the in-situ solution heat treatment steps 750 and/or 760, as in the case of press-quenching. In some embodiments, the deposition layer may undergo rapid cooling via cryogenic quenching or the like. And in still other embodiments, both the deposition layer and the substrate to which it is being applied can undergo simultaneous cooling or quenching via one or more cryogenic spray nozzles or the like being provided both above and below the substrate, as discussed.

In sum, by controlling the temperature and grain structure of the substrate, feedstock or filler material, and deposition layer using a series of heat, cooling, voltage, and/or electromagnetic sources as described herein, a component being additively manufactured can achieve increased strength and other mechanical properties as compared to known additively manufactured processes, thus exhibiting mechanical properties consistent with cast or even wrought components without the post-formation processing necessary for traditional additive manufacturing processes. Moreover, induction heating allows control of the heating depth based on frequency and can be tailored to ensure full incremental heat treatment of deposited zones in the deposited volume, heat affected zone, and desired depth within the base metal (substrate).

Embodiments of the invention allows incremental heating and cooling one zone (volume) at a time. The ability to incrementally limit the volume of metal that remains hot at any given time can minimize buildup of thermal stresses and the resultant stresses and strain, thereby minimizing dimensional instability and the tendency for distortion. Also, the ability to locally solution treat the deposited material and heat affected zone into the base metal allows attainment of optimized microstructures to consistently achieve wrought alloy parity.

Moreover, embodiments of the invention eliminate or reduce the need for post-additive manufacturing process steps. In-situ solution heat treatment and microstructure control eliminates the need for subsequent annealing or solution treatment steps. The non-contact sensors (e.g., the infrared pyrometers) used for real-time control of temperature can also be incorporated into an in-situ inspection system for the additive manufactured products, minimizing the need for inspection after the part has been built. This feature can allow real-time, in-process repair immediately after a potential defect is generated, increasing manufacturing yield, efficiency, and the cost-effectiveness of the process.

Embodiments of the invention also provide the ability to control the minimum temperature of the substrate via resistance or radiation heat transfer. Such control can be used both to minimize residual stresses, and to facilitate metal additive manufacturing for quench cracking sensitive alloys. For large parts requiring long deposition times, this feature (with proper durational control) can also be used for situ aging of aluminum alloys and tempering of certain martensitic alloy steels.

Although the invention has been described with reference to the embodiments illustrated in the attached drawings, it is noted that equivalents may be employed without departing from the scope of the invention as recited in the claims.

What is claimed is:

1. A method of additively manufacturing a metallic component, the method comprising:
   a. depositing, using a deposition head operatively controlled by a central processing unit, filler material on a substrate forming a deposition layer;
   b. measuring, via a temperature sensor controlled by the central processing unit, a temperature of a heat affected zone corresponding to the deposition layer;
   c. solution heat treating the deposition layer subsequent to the depositing, wherein said solution heat treating comprises: heating the deposition layer using a heat source to a solution temperature so as to achieve solution heat treatment, and using a cooling source, controlling a cooling rate of the deposition layer to at or above the critical cooling rate of the filler material until a target temperature is reached; and
   d. repeating steps (a)-(c) for multiple deposition layers as the metallic component is being formed;
   wherein the deposition head, the heat source, and the cooling source are connected so that, when the deposition head, the heat source, and the cooling source move, the deposition head, the heat source, and the cooling source move together, in unison, in relation to the substrate on one side of the metallic component while performing steps (a)-(d).

2. The method of claim 1, wherein the filler material is one of: an aluminum alloy, a titanium alloy, a precipitation hardening stainless steel, an austenitic corrosion resistant steel, a martensitic corrosion resistant steel, or a nickel base alloy.

3. The method of claim 2, wherein the solution temperature is one of: when the filler material is the aluminum alloy, 850-1025 degrees Fahrenheit; when the filler material is the titanium alloy, 1400-1925 degrees Fahrenheit; when the filler material is the precipitation hardening stainless steel, 1750-1950 degrees Fahrenheit; when the filler material is the austenitic corrosion resistant steel, 1750-2050 degrees Fahrenheit; when the filler material is the martensitic corrosion resistant steel, 1750-1950 degrees Fahrenheit; and when the filler material is the nickel base alloy, 1700-2200 degrees Fahrenheit.

4. The method of claim 2, wherein the critical cooling rate is one of: when the filler material is the aluminum alloy, 50-1000 degrees Fahrenheit per second; when the filler material is the titanium alloy, 1-1000 degrees Fahrenheit per second; when the filler material is the precipitation hardening stainless steel, 1-1000 degrees Fahrenheit per second; when the filler material is the austenitic corrosion resistant steel, 1-1000 degrees Fahrenheit per second; when the filler material is the martensitic corrosion resistant steel, 30-1000 degrees Fahrenheit per second; and when the filler material is the nickel base alloy, 1-1000 degrees Fahrenheit per second.

5. The method of claim 2, wherein the target temperature is one of: when the filler material is the aluminum alloy, −50 to 200 degrees Fahrenheit; when the filler material is the titanium alloy, 70 to 900 degrees Fahrenheit; when the filler material is the precipitation hardening stainless steel, −100 to 70 degrees Fahrenheit; when the filler material is the austenitic corrosion resistant steel, −100 to 70 degrees Fahrenheit; when the filler material is the martensitic corrosion resistant steel, 70 to 250 degrees Fahrenheit; and when the filler material is the nickel base alloy, 70 to 1000 degrees Fahrenheit.

6. The method of claim 1, wherein the temperature sensor controlled by the central processing unit is an infrared pyrometer.

7. The method of claim 1 further comprising preheating the substrate prior to the depositing the filler material on the substrate.

8. The method of claim 7 further comprising preheating the filler material prior to the depositing the filler material on the substrate.

9. The method of claim 1, wherein the heating the deposition layer to a solution temperature is performed via an induction heater controlled by the central processing unit.

10. The method of claim 1, wherein the controlling the cooling rate of the deposition layer includes quenching the deposition layer using a cryogenic spray nozzle controlled by the central processing unit.

11. The method of claim 1, further comprising:
   inducing, via a voltage source controlled by the central processing unit and via leads attached to the substrate, an electron flow in the deposition layer, wherein the depositing includes forming a heat affected zone in the deposition layer and the substrate including molten filler material, and wherein the inducing the electron flow includes pulsing current from the leads into the substrate to electromagnetically stir the molten filler material in the heat affected zone.

12. The method of claim 11 further comprising adjusting, via the central processing unit, one of: current density of the voltage source, frequency of a current induced by the voltage source, polarity of the voltage source, or pulsing parameters of the voltage source.

13. A system for in-situ solution heat treating an additively manufactured component, the system comprising:
- a deposition head;
- a temperature sensor;
- a heat source;
- a cooling source; and
- a central processing unit configured to control the operation of the deposition head, the temperature sensor, the heat source, and the cooling source to perform the method of claim 1.

14. The system of claim 13 further comprising a voltage source, wherein the central processing unit is further configured to control the operation of voltage source in order to induce an electron flow in the deposition layer, wherein step (a) includes forming a heat affected zone in the deposition layer and the substrate including molten filler material, and wherein the inducing the electron flow includes electromagnetically stirring the molten filler material in the heat affected zone.

* * * * *